United States Patent [19]

Hedley et al.

[11] Patent Number: 4,689,677
[45] Date of Patent: Aug. 25, 1987

[54] VIDEO SIGNAL PROCESSING CIRCUITS

[75] Inventors: David J. Hedley, Winchester; Morgan W. A. David, Farnham, both of United Kingdom

[73] Assignee: Sony Corporation, Tokyo, Japan

[21] Appl. No.: 783,116

[22] Filed: Oct. 2, 1985

[30] Foreign Application Priority Data

Oct. 31, 1984 [GB] United Kingdom ............... 8427479

[51] Int. Cl.$^4$ ............................................. H04N 5/14
[52] U.S. Cl. .................................... 358/160; 358/183; 340/747
[58] Field of Search ................. 358/22, 181, 182, 183, 358/160, 104; 340/747, 725, 729; 364/522

[56] References Cited

U.S. PATENT DOCUMENTS 4,317,114  2/1982  Walker ................................. 340/747
4,439,760  3/1984  Fleming ............................... 340/747
4,475,104 10/1984  Shen .................................... 340/747

FOREIGN PATENT DOCUMENTS

86/00454  1/1986  PCT Int'l Appl. ................. 340/347

OTHER PUBLICATIONS

"Considerations Regarding the Use of Digital Data to Generate Video Backgrounds" by E. Leonard, SMPTE Journal, vol. 87, pp. 499-504, 8/78.

Primary Examiner—James J. Groody
Assistant Examiner—David E. Harvey
Attorney, Agent, or Firm—Lewis H. Eslinger; Alvin Sinderbrand

[57] ABSTRACT

A video signal processing circuit receiving an input sample data relating to sample positions in a video field and in association with the sample data for each sample position associated z data indicating the apparent position of the sample data in a direction perpendicular to a video display of the video field, a first memory for storing the sample data relating to each sample position in the video field, a second memory for storing the z data relating to each sample position in the video field, and a comparator circuit for comparing for each sample position in the video field the value of the input said data with the z data for that sample position stored in the second memory and for supplying a write enable signal only if the value of the input z data represents a sample position in front of that represented by the stored data, the input sample data being written into the first memory and the new z data being written into the second memory under control of a write enable signal.

5 Claims, 5 Drawing Figures

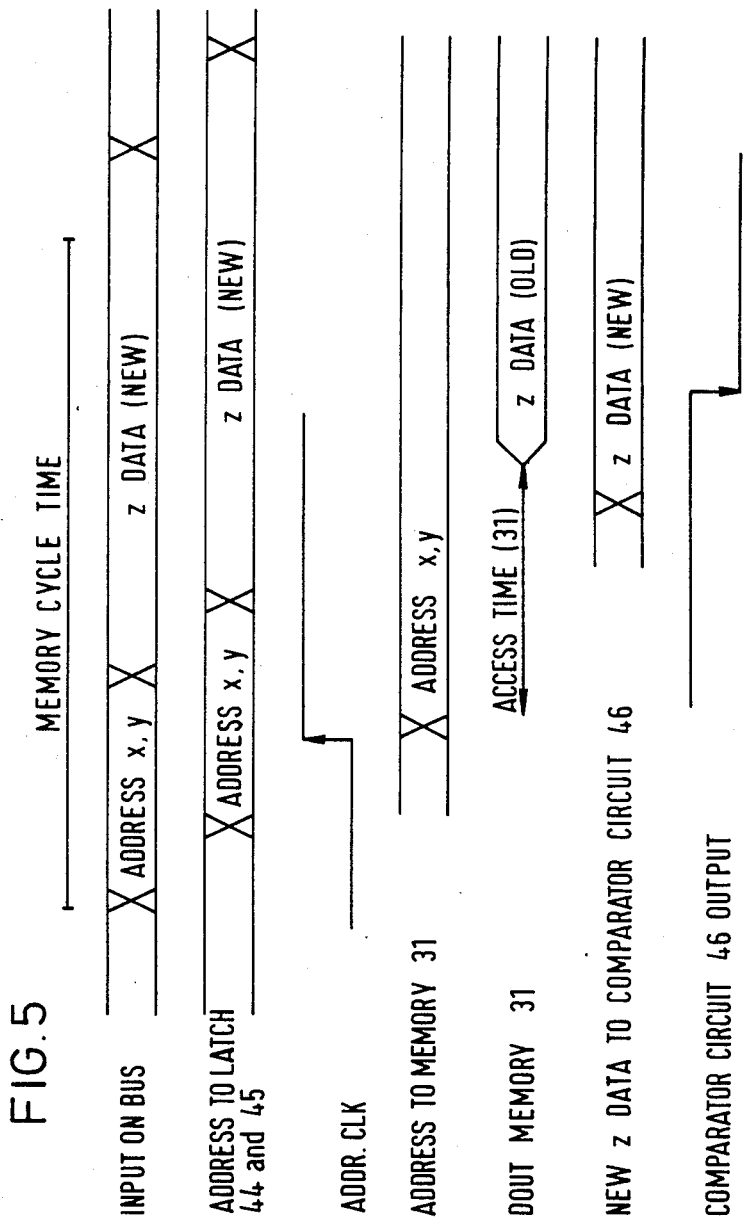

VIDEO SIGNAL PROCESSING CIRCUITS

BACKGROUND OF THE INVENTION

1. Field of the Invention

This invention relates to video signal processing circuits. More particularly, but not exclusively, this invention relates to video signal processing circuits which are suitable for use in special effects equipment in high definition video systems.

2. Description of the Prior Art

The standard television signal transmitted in the United Kingdom is a PAL signal of a 625-lines per frame, 50-fields per second system, and the PAL, NTSC and SECAM signals transmitted in other countries use similar or slightly lower line frequencies (for example 525 lines per frame), and similar or slightly higher field frequencies (for example 60 fields per second). While there is no immediate prospect of significant changes in the transmitted signals, there is an increasing requirement for higher definition video systems. Such systems can be used, for example, in film-making, in closed-circuit television systems, in satellite communication systems and in studio use generally. One such proposed high definition video system uses 1125 lines per frame and 60 fields per second. This proposed system also uses a 5:3 aspect ratio instead of the 4:3 aspect ratio now usual for television receivers.

The special effects which can be applied to a video signal are well known. Thus, for example, images on a cathode ray tube can be off-set (moved in any direction), scaled (expanded or compressed in size), rolled (rotated in two or three dimensions) and so on. Some of these special effects effectively involve treating the video signal as if it existed in three dimensions, the third dimension, that is the dimension normal to the plane of the television screen generally being referred to as the z-dimension. Where the z-dimension is involved, one particular problem is in eliminating hidden surfaces. Software algorithms for eliminating hidden surfaces using a z-buffer are known and are used when generating images such as in computer-aided design. See, for example, "Computer Display of Curved Surfaces" by Edwin Catmull of New York Institute of Technology. However, when using such algorithms in a computer, the necessary calculations take up to seconds to complete, making this implementation unsuitable for the real time operation necessary in a video system, particularly a high definition video system, where only nanoseconds are available for processing the information.

SUMMARY OF THE INVENTION

One object of the present invention is to provide a video signal processing circuit for eliminating hidden surfaces.

Another object of the present invention is to provide a video signal processing circuit comprising a memory in which data is stored or not stored in dependence on the address of the data in the direction perpendicular to a video display.

According to the present invention there is provided a video signal processing circuit comprising:

means for supplying input sample data relating to sample positions in a video field and in association with said sample data for each said sample position associated z data indicating the apparent position of said sample data in a direction perpendicular to a video display of said video field;

a first memory means for storing said sample data relating to each said sample position in said video field;

a second memory means for storing said z data relating to each said sample position in said video field;

means for comparing for each said sample position in said video field the value of the input z data with the z data for that sample position stored in said second memory means and for supplying a write enable signal only if said value of said input z data represents a sample position in front of that represented by said stored z data; and means to write or over-write said input sample data into said first memory means and to over-write said new z data into said second memory means under control of said write enable signal.

The above, and other objects, features and advantages of this invention will be apparent from the following detailed description of illustrative embodiments which is to be read in connection with the accompanying drawings.

BRIEF DESCRIPTION OF THE DRAWINGS

FIG. 5 shows time charts used in describing the operation of the equipment.

DESCRIPTION OF THE PREFERRED EMBODIMENTS

Figure 1:
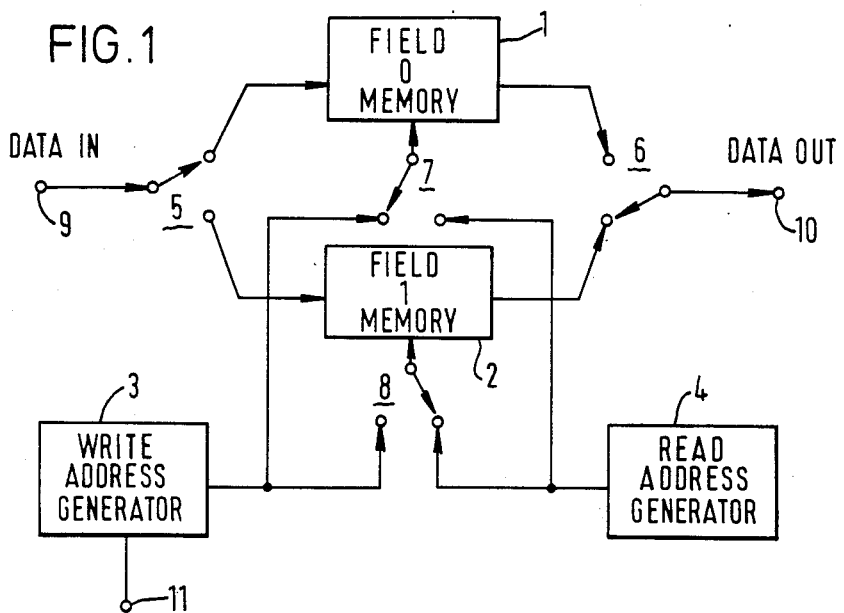
FIG. 1 shows in simplified block from part of a special effects equipment for a high definition video system.

Before describing the embodiment, the overall arrangement of an example of a special effects equipment for the high definition video system outlined above will be briefly described with reference to FIG. 1.

Basically, the special effects equipment comprises two field memories, a field zero memory 1 and a field one memory 2, together with a write address generator 3 and a read address generator 4. These elements are interconnected by switches 5, 6, 7 and 8, each of which is operated at the field frequency. Input data supplied to an input terminal 9 are selectively supplied by way of the switch 5 to the field zero memory 1 or the field one memory 2. Output data for supply to an output terminal 1 are selectively derived by the switch 6 from the field zero memory 1 or the field one memory 2. The write address generator 3 and the read address generator 4 are selectively and alternately connected to the field zero memory 1 and the field one memory 2 by the switches 7 and 8.

In operation of this special effects equipment, an input analog signal is sampled 2048 times per horizontal scan line and the resulting sample values are pulse code modulation coded into 8-bit words to form the input digital data which are supplied to the input terminal 9. Writing proceeds alternately in the field zero memory 1 and the field one memory 2 in dependence on the position of the switch 5 and under the control of the write address generator 3. The necessary complex address calculations which are required so as not only to achieve simple writing and reading of the individual digital signals into and out of the appropriate memory 1 or 2, but also to modify the positions of the individual digital signals in a cathode ray tube screen or other video display raster so as to achieve the required special effect, are achieved under the control of a signal supplied to the write address generator 3 by way of an input terminal 11. The precise way in which this is done is not of significance to the present invention and will not therefore be described in further detail here. When a complete field has been written in the memory 1 or 2, the switches 5 to 8 change position and the digital signals stored in that memory 1 or 2 are then sequentially read out under control of the read address generator 4 and supplied to the output terminal 10, while the digital signals for the next field are written in the other memory 2 or 1.

The present invention is particularly concerned with the problem of writing the digital signals in the memories 1 and 2 when the special effect necessitates consideration of the z-dimension position of the data, and in particular where elimination of hidden surfaces is required. This problem will be better understood by consideration of FIG. 2.

Figure 2:
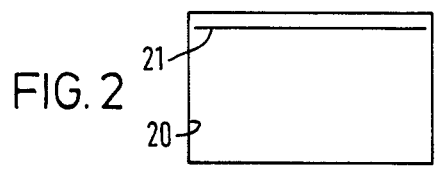
FIG. 2 indicates diagrammatically the screen of a television receiver for describing a typical z-dimension problem which can arise in special effects generation.

FIG. 2 indicates the screen 20 of a television receiver on which a straight horizontal line 21, assumed to correspond in position with a horizontal scan line of the receiver is displayed. Consider now that the line 21 is folded back on itself while remaining in the same horizontal plane, so that the right-hand end of the line appears to move perpendicularly away from the screen 20 towards the viewer and backwards in the horizontal direction towards the left-hand end of the line 21. It will be realised that as this movement proceeds, data relating to sample points at the right-hand end of the line 21 will need to over-write data earlier supplied to the memories 1 or 2 and relating to sample points positioned more to the left in the line 21, because those data relate to a surface which is becoming hidden. Similarly, if the line 21 were folded in the other direction, that is to say away from the viewer, then such over-writing would not be necessary, because the later supplied data would relate to the surface which was becoming hidden. The decision whether or not to store the data is taken in dependence on the z-dimensional position of the data, and it is necessary that this decision be taken in real time, which, in such a television system, involves operation at extremely high speed.

Figure 3:
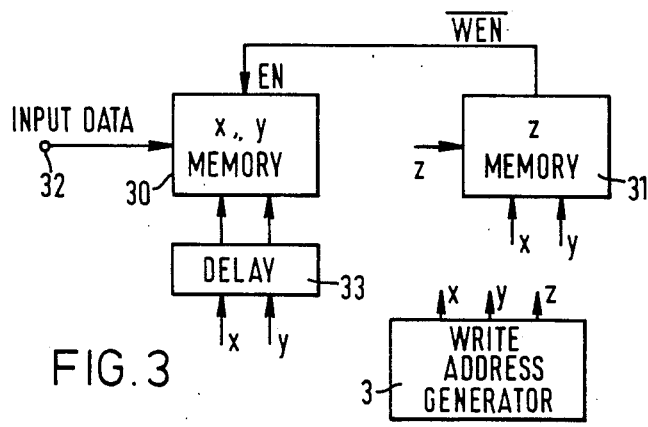
FIG. 3 shows in block from a part of the equipment of FIG. 1 in slightly more detail.

Referring now to FIG. 3, this shows one of the memories 1 or 2 and the write address generator 3 in somewhat more detail. Each of the memories 1 and 2 comprises a Y,U/V memory 30 and a z memory 31, although as explained below the z memory 31 is preferably common to the memories 1 and 2. The Y,U/V memory 30, hereinafter referred to as the x/y memory 30, stores the 8-bit words forming the pulse code modulated luminance and chrominance sample data, according to the two-dimensional or x and y positions of the individual samples, that is, according to the raster position of the sample in the plane of the television screen. Thus, the x/y memory 30 is required to store data relating to 2048 samples for each of approximately 520 active scan lines. It is emphasised that the data stored in the x/y memory 30 is information data relating to the actual values of the samples.

The z memory 31 stores 8-bit words representing the z-dimension position, or depth information, for each of the luminance and chrominance sample data stored in the x/y memory 30, and, as in the x/y memory 30, this data is stored according to the two-dimensional x and y positions of the individual samples. It is, however, emphasised that the data stored in the z memory 31 merely relates to the position of the sample in the z-dimension and not to the actual value of the sample. The words stored in the z memory 31 may be 8-bit words, but this is not essential, and words of shorter or longer length can be used depending on the accuracy with which it is required to resolve the positions of two samples which are closely adjacent to one another in the z-dimension.

The write address generator 3 generates x,y and z address signals in dependence on the special effect required. The x and y address signals are supplied to the x/y memory 30 and the x,y and z address signals are supplied to the z memory 31. The input 8-bit data words supplied by way of an input 32 to the x/y memory 30 are stored or not stored therein in dependence on a write enable signal $\overline{\text{WEN}}$ generated by a comparator circuit associated with the z memory 31. This comparison is carried out before writing because the data written in the x/y store memory 30 relates to the output field to be read from the x/y store memory 30, and hence hidden surface data is not written therein. Thus, for each input data word presented to the x/y memory 30, the comparator circuit checks the data held in the z memory 31 in respect of that sample position with the z data corresponding to the input data word, and the input data word is only written in the x/y memory 30 if the z data indicates that it is nearer to the viewing plane than any data already written in the x/y memory 30 and corresponding to that sample position. For this purpose all the x/y locations in the z memory 31 are set to a zero datum level during the vertical blanking interval preceding each field. This zero datum level is chosen to correspond to the value of z corresponding to the furthest distance from the viewing plane. Because all the data in the z memory 31 is reset in this way prior to each field, it will be appreciated that the z memory 31 can be common to the memories 1 and 2 as indicated above. Because the comparator circuit requires some time to effect the comparison, the x and y address signals are supplied to the x/y memory 30 by way of a delay circuit 33, or alternatively are latched so as to be available if and when the write enable signal $\overline{\text{WEN}}$ is supplied.

Figure 4:
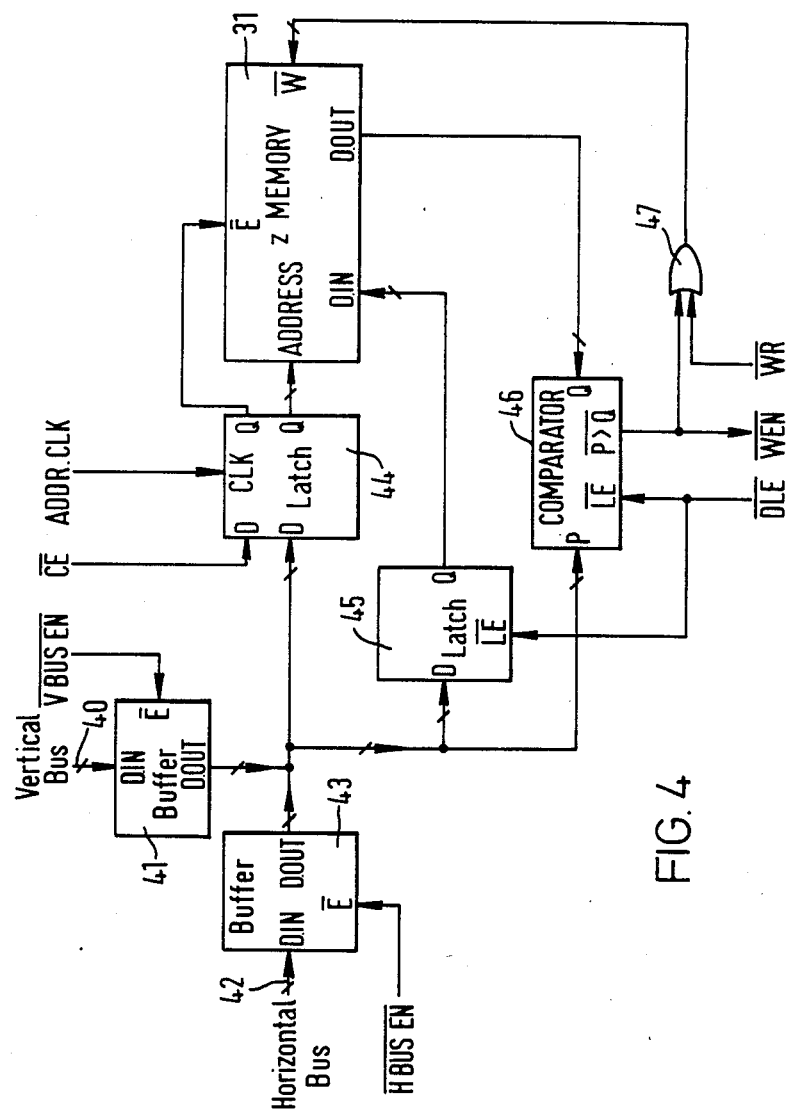
FIG. 4 shows in block form a part of the equipment of FIG. 1 in still more detail.

The comparator circuit associated with the z memory 31 will now be described in more detail with reference to FIG. 4.

The x and y address signals, and also the z address signals, which for convenience will hereinafter be referred to as the z data, are supplied in common over a vertical bus 40 to a buffer circuit 41 or over a horizontal bus 42 to a buffer circuit 43. It is sufficient to say that the effect is that this simultaneous supply of data results in the required speed of operation being cut by a factor of eight, but even so in the television system referred to above it is still necessary to complete each comparison within a cycle time of 114 nanoseconds.

Vertical and horizontal bus enable signals $\overline{\text{VBUSEN}}$ and $\overline{\text{HBUSEN}}$ are respectively supplied to the buffer circuits 41 and 43, and the outputs of the buffer circuits 41 and 43 are connected in common to a latch circuit 44, a latch circuit 45 and a comparator circuit 46. A chip enable signal $\overline{\text{CE}}$ and an address clock ADDRCLK are supplied to the latch circuit 44, which supplies outputs to an enable input and the address input of a random access memory (RAM) which forms the z memory 31. The latch circuit 45 supplies an output to the data input of the z memory 31, while a data output of the z memory 31 is connected to a second input of the comparator circuit 46. A data latch enable signal $\overline{\text{DLE}}$ is supplied to the latch circuit 45 and to the comparator circuit 46, while the write enable signal $\overline{\text{WEN}}$ is developed by the comparator circuit 46 and supplied to the x/y memory 30 (FIG. 3) and also to one input of an OR-circuit 47. To a second input of the OR-circuit 47 is supplied a write pulse $\overline{\text{WR}}$ and the output of the OR-circuit 47 is supplied to the write input of the z memory 31.

The operation will now be described with reference also to FIG. 5 which is a time chart indicating rather more than one memory cycle time of 114 nanoseconds. Initially, one of the buffer circuits 41 or 43 will supply the x and y address signals which will be latched in the latch circuit 44. Thereafter the z data, or more accurately the new z data relating to that sample position, is supplied by the buffer circuit 41 or 43 and is held in the latch circuit 45 and is also latched at the P input of the comparator circuit 46.

On receipt of the next address clock ADDRCLK the latch circuit 44 supplies the x and y address signals to the z memory 31 which, after an access time, taken to be 35 nanoseconds, supplies the old z data stored at that address to the Q-input of the comparator circuit 46 where it is likewise latched. The new and the old z data are then compared by the comparator circuit 46. If the new z data is greater than the old z data, that is to say if the new z data relating to that sample position represents a position in the z direction nearer the viewing plane than the old z data (or alternatively is the first input z data received in respect of that sample position in that field, in which case the new z data will be greater than the old z data because the old z data is at the zero datum), then the comparator circuit 46 supplies the write enable signal $\overline{\text{WEN}}$.

Receipt of the write enable signal $\overline{\text{WEN}}$ by the x/y memory 30 (FIG. 3) causes the input sample data relating to that x/y position to be written (or over-written) in the appropriate position in the x/y memory 30. Additionally, however, if the write enable signal $\overline{\text{WEN}}$ is present on the first input of the OR-circuit 47 at the time of the write pulse $\overline{\text{WR}}$, then the write pulse $\overline{\text{WR}}$ is supplied to the write input of the z memory 31 and the new z data is over-written at the appropriate x/y position in the z address 31.

Various modifications are of course possible without departing from the invention as defined by the appended claims, and in particular the data rates, cycle times and word lengths referred to above are given only by way of example.

We claim:

1. A video signal processing circuit:
   means for supplying input sample date relating to sample positions in a video field and input z data associated with each sample position which has a value indicating the apparent position of said sample data in a direction perpendicular to a two-dimensional video display of said video field;
   a first memory means for storing said sample data relating to each sample position in said video field;
   a field memory means for storing said z data relating to each sample position in said video field;
   means for comparing, for each said sample position in said video field, the value of input z data with the value of z data for a corresponding sample position stored in said field memory means and for supplying a write enable signal only if said value of said input z data indicates an apparent position in front of that indicated by said stored z data, relative to said direction perpendicular to said display;
   means to write said input sample data into said first memory means and to over-write said input z data into said field memory means under control of said write enable signal; and
   means for resetting said z data stored in said second memory to a zero datum value during the vertical blanking interval between successive video fields.

2. A circuit according to claim 1 wherein said first memory means comprises a pair of memories which are alternately written in and read from in alternate ones of successive video fields.

3. A circuit according to claim 2 wherein said field memory means is associated with both memories of said pair of memories.

4. A circuit according to claim 1 wherein said input sample data relating to sample positions in a video field comprises data relating to a video sample at a sample position and x and y data indicating a location of said sample position in said video display.

5. A circuit according to claim 4 further comprising a first latch circuit for latching said x and y data for supply to said first memory means and a second latch circuit for latching said input z data for supply to said field memory means.

* * * * *